United States Patent
Misdom

[11] Patent Number: 5,107,411
[45] Date of Patent: Apr. 21, 1992

[54] INTERFERENCE FREE, PULSE TYPE TRANSFORMER

[75] Inventor: Johannes A. C. Misdom, Eindhoven, Netherlands

[73] Assignee: U.S. Philips Corporation, New York, N.Y.

[21] Appl. No.: 547,558

[22] Filed: Jul. 2, 1990

[30] Foreign Application Priority Data

Jul. 28, 1989 [NL] Netherlands ............... 8901961

[51] Int. Cl.$^5$ ............................................. H02M 3/335
[52] U.S. Cl. ................................. 363/20; 336/182; 363/40; 363/131
[58] Field of Search ............ 363/15, 200, 21, 40, 363/131; 323/355, 359

[56] References Cited

U.S. PATENT DOCUMENTS

| | | | |
|---|---|---|---|
| 3,617,854 | 4/1970 | Cole | 336/229 |
| 4,089,049 | 5/1978 | Suzuki et al. | 363/17 |
| 4,133,025 | 1/1979 | Wurzburg | 363/41 |
| 4,280,174 | 7/1981 | Sonda | 363/24 |
| 4,441,146 | 4/1984 | Vinciarcelli | 363/20 |
| 4,455,545 | 6/1984 | Shelly | 336/229 |
| 4,517,472 | 5/1985 | Ruitberg et al. | 363/19 |
| 4,635,179 | 1/1987 | Carsten | 363/70 |

*Primary Examiner*—Jeffrey Sterrett
*Attorney, Agent, or Firm*—Bernard Franzblau

[57] ABSTRACT

An electric voltage generator comprises a transformer (1) having a ferromagnetic core (3), a primary winding (5) and a secondary winding (7). The primary winding (5) includes a first primary coil (31) wound in the form of a solenoid and the secondary winding (7) includes a first secondary coil (33) wound in the form of a solenoid. These coils (31, 33) have the same length, have the same number of turns of wire of the same diameter, and are concentrically disposed on the core (3) in the same axial position. Their winding sense and connection to a primary circuit (9) and a secondary circuit (19), respectively, are chosen so that correspondingly situated ends of these two coils carry alternating voltages of the same polarity in the operating condition. Consequently, correspondingly situated turns of the two coils carry the same alternating voltage and interference signals cannot be transferred via the parasitic capacitance (37) between the primary winding (5) and the secondary winding (7).

9 Claims, 1 Drawing Sheet

INTERFERENCE FREE, PULSE TYPE TRANSFORMER

BACKGROUND OF THE INVENTION

This invention relates to a generator for generating an electric voltage, comprising a transformer having a core of ferromagnetic material, a primary winding and a secondary winding, the primary winding comprising a first primary coil wound in the form of a solenoid, said primary winding being connected to a primary circuit which comprises a source of time-dependent voltages, the secondary winding comprising a first secondary coil wound in the form of a solenoid and being connected to a secondary circuit, which first primary and secondary coils are concentrically disposed on the core with intermediate electrical insulation means.

The invention also relates to a transformer suitable for such a generator.

A generator of this kind is known from DE-B 2 626 285, which corresponds to U.S. Pat. No. 4,089,049 (May, 19, 1978). From this document it is also known that interference from the secondary circuit can reach the input terminals of the primary circuit via the capacitance existing between the primary and secondary windings. Such interference may have adverse effects on other circuits. Conversely, interference from the primary circuit can also reach the secondary circuit and a load connected thereto. The transfer of such interference is counteracted in the known generator by using electrostatic shields between the primary and secondary windings. Even though this method leads to the desired result, it also has a number of drawbacks. The introduction of the shields increases the cost of the transformer and its dimensions and weight also become greater. The coupling factor between the windings becomes smaller and hence the leakage inductance increases. Consequently, part of the energy is not transformed from the primary to the secondary side of the transformer. In order to protect the primary circuit, this energy must be dissipated, for example, in resistance networks. A small but not insignificant part of the power to be transferred may thus be lost.

NL-A-87 02 133, which corresponds to U.S. application Ser. No. 239,575 filed Sept. 1, 1988, describes a transformer in which an interference voltage between a primary and a secondary reference point is suppressed without utilizing electrostatic shields. To achieve this, the primary winding comprises a first and a second primary coil across which the voltage drop amounts to $U_{1p}$ and $U_{2p}$, respectively, in the operating condition and which are capacitively coupled to a first and a second secondary coil, respectively, across which the voltage drop amounts to $U_{1s}$ and $U_{2s}$, respectively, in the operating condition. The coupling capacitances amount to $C_{1p}$ and $C_{2p}$, respectively. The object is achieved in that the following condition is satisfied:

$$C_1(U_{1s}-U_{1p})=C_2(U_{2p}-U_{2s}).$$

In order to satisfy this condition, the properties of the insulation means and the number of turns of the primary and secondary coils must be carefully selected. Consequently, the construction of the transformer is comparatively complex and expensive.

SUMMARY OF THE INVENTION

It is an object of the invention to provide a generator of the kind set forth in which the transfer of interference voltages from the secondary to the primary circuit and vice versa is counteracted in a simple and inexpensive manner.

To achieve this, the generator in accordance with the invention is characterized in that the first primary coil and the first secondary coil have the same length, comprise the same number of turns of wire of the same diameter, and occupy the same axial position on the core, the winding sense of these coils and their connection to the primary circuit and the secondary circuit being chosen so that correspondingly situated ends of both coils carry alternating voltages of the same polarity in the operating condition.

The invention is based on the recognition of the fact that the correspondingly situated turns of the first primary and secondary coils thus constructed carry the same alternating voltage. Therefore, interference energy is not transferred via the parasitic capacitance existing between these turns.

When the transformer has a transformation ratio 1:1, the first primary coil may constitute the entire primary winding and the first secondary coil may constitute the entire secondary winding. In the case of a different transformation ratio, or if the primary or the secondary winding is extended by means of auxiliary windings, for example, for generating auxiliary voltages, further primary and/or secondary coils will be required in addition to the first primary and secondary coils comprising the same number of turns. An embodiment of the generator in accordance with the invention which comprises such further coils is characterized in that the further coils associated with the primary winding or the secondary winding have a length which at the most equals the length of the first primary and secondary coils and are disposed on the core so that a straight line between any point of a further primary or secondary coil and any point of the first secondary or primary coil always intersects the first primary or secondary coil. In a transformer thus constructed the first primary and secondary coils also serve for shielding, so that no capacitive coupling arises between the further primary or secondary coils on the one side and the secondary or primary winding on the other side.

BRIEF DESCRIPTION OF THE DRAWINGS

These and other aspects of the invention will be described in detail with reference to the accompanying drawing in which.

DESCRIPTION OF THE PREFERRED EMBODIMENTS

Figure 1:
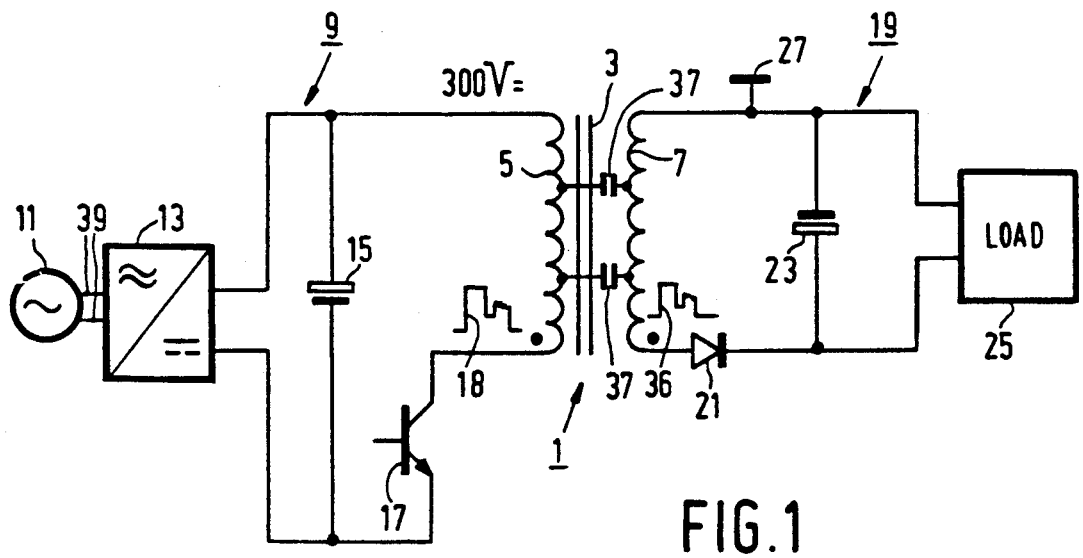
FIG. 1 shows a simplified circuit diagram of an embodiment of a generator in accordance with the invention, FIG. 2 diagrammatically shows a part of a transformer used in the generator shown in FIG. 1, and FIGS. 3A and 3B diagrammatically illustrate the construction of transformers suitable for further embodiments of the generator in accordance with the invention.

The circuit diagram shown in FIG. 1 shows, inter alia, the parts of an embodiment of a generator in accordance with the invention which are essential for a proper understanding of the invention. The present embodiment of the generator is suitable for generating a DC voltage and comprises a transformer 1 having a core 3 of ferromagnetic material (for example, ferrite), a primary winding 5 and a secondary winding 7. The primary winding 5 is connected to a primary circuit 9 which comprises a rectifier circuit 13 which is connected to the AC supply mains 11 and to a smoothing capacitor 15. A smoothed DC voltage of, for example, 300 V arises across the capacitor 15. The primary circuit 9 also comprises a switching transistor 17 which periodically interrupts the DC voltage so that the latter is applied to the primary winding 5 in the form of voltage pulses 18. Circuits of this kind are known per se (see, for example, the cited DE-B-2 626 285) so that they need not be described in detail herein.

The secondary winding 7 is connected to a secondary circuit 19 which comprises a rectifier 21 and a smoothing capacitor 23. The output of the secondary circuit 19 is connected to a load 25, for example, an apparatus to be powered by a DC voltage. The secondary circuit 19 is connected to a secondary reference point 27.

Figure 2:
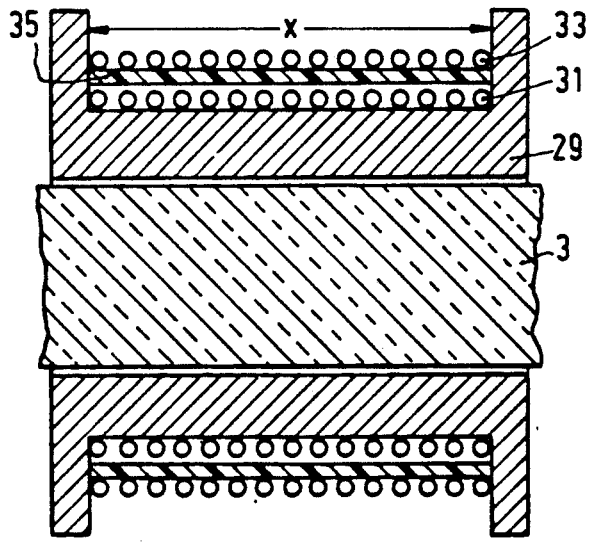

FIG. 2 diagrammatically shows the construction of the transformer 1. Around the ferromagnetic core 3 (only partly shown) there is arranged a coil former 29 which is made of an electrically insulating material (for example, a suitable plastic) and on which the primary and secondary windings 5, 7 are disposed. The primary winding of the present embodiment consists exclusively of a single first primary coil 31 wound in the form of a solenoid. The secondary winding consists exclusively of a first single secondary coil 33 wound in the form of a solenoid. The coils 31 and 33 are concentrically disposed on the core with intermediate electric insulation means in the form of an electrically insulating foil 35. The length x of the first primary coil 31 equals that of the first secondary coil 33 and both coils comprise the same number of turns of wire having the same diameter. Moreover, they occupy the same axial positions on the core 3. As is denoted in a customary manner by a dot at the primary and secondary windings 5, 7 in FIG. 1, the winding sense of the coils 31, 33 and their connection to the primary circuit 9 and the secondary circuit 19, respectively, are chosen so that the correspondingly situated ends of the two coils carry alternating voltages of the same polarity. Therefore, a voltage pulse 36 arises across the secondary winding 7 which is substantially identical to the primary voltage pulse 18. Thanks to these steps, correspondingly situated turns of the two coils always carry the same alternating voltage, so that no current flows via the capacitances existing between these turns. The capacitance between such corresponding turns of the coils is symbolically represented by capacitors 37 in FIG. 1. It is formed in that the corresponding turns are coupled to one another via the dielectric formed by the insulating foil 35.

Consequently, no high-frequency currents can flow from the first secondary coil 33 to the first primary coil 31 via the capacitances 37. As a result, interference signals arising in the secondary circuit 19 cannot reach the primary circuit 9. Therefore, they cannot penetrate the AC supply 11, nor can they be emitted via the connection leads 39 between the primary circuit 9 and the AC supply mains 11, which act as aerials. Conversly, interference signals from the primary circuit 9 cannot penetrate the load 25 via the parasitic capacitances 37 and the secondary circuit 19.

The primary and secondary windings of the first embodiment described with reference to the FIGS. 1 and 2 each consist of a single solenoid coil. These coils have the same number of turns, so that the transformer 1 has a transformation ratio 1:1. This transformer serves for DC uncoupling of the secondary circuit 19 from the AC supply 11. Such uncoupling is required in many cases for safety reasons. However, the transformer 1 may alternatively require a different transformation ratio. In such a case the primary winding 5 comprises more or less turns than the secondary winding 7. In known transformers the winding comprising the larger number of turns is then customarily wound using a wire which is thinner than the wire of the winding comprising the smaller number of turns. As a result, it would no longer be possible for all correspondingly situated primary and secondary turns to carry the same alternating voltage.

Figure 3A:
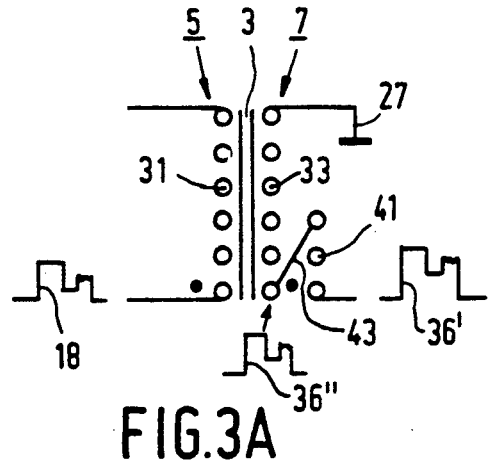
Figure 3B:
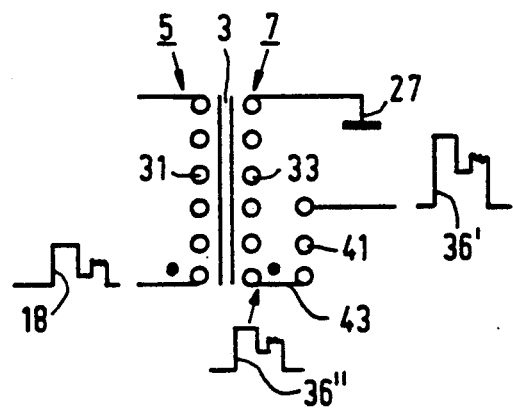

FIGS. 3A and 3B show two further embodiments of transformers in accordance with the invention in which this problem has been solved. In these transformers the secondary winding 7 comprises more turns than the primary winding 5, so that the secondary voltage pulse 36' is greater than the primary voltage pulse 18. The secondary winding 7 is sub-divided into a first secondary coil 33 and a second secondary coil 41. As in the first embodiment, the primary winding 5 consists of a single first primary coil 31. The second secondary coil 41 is connected in series with the first secondary coil 33 via a connection lead 43. Preferably, the connection lead 43 and the second secondary coil 41 are made of the same wire as the first secondary coil 33. The entire secondary winding 7 can then be wound on a suitable winding machine without interruption. The winding sense of the second secondary coil 41 may be the same as that of the first secondary coil 33 as shown in FIG. 3A. The winding sense of the second secondary coil 41, however, may also oppose that of the first secondary coil 33, as shown in FIG. 3B. The winding sense of the first primary and secondary coils 31, 33 and their connection to the primary and the secondary circuit 9, 19, respectively, are chosen, as in the first embodiment, so that correspondingly situated ends of these coils carry alternating voltages of the same polarity in the operating condition, as denoted by a dot in the FIGS. 3A and 3B. Thus, across the first secondary coil 33 again a voltage pulse 36" arises which is substantially identical to the primary voltage pulse 18. Consequently, in these embodiments too no high-frequency currents flow from the first secondary coil 33 to the first primary coil 31. Because the first secondary coil 33 acts as an electrostatic shield between the second secondary coil 41 and the first primary coil 31 in the described manner, no high-frequency currents will flow between the two latter coils either. Interference signals, therefore, cannot penetrate the primary circuit 9 from the secondary circuit 19.

When the transformer 1 comprises further secondary coils, they are shielded from the first primary coil 31 in the same way by the first secondary coil 33. Such further secondary coils may be connected in series, like the second secondary coil 41, with the first secondary coil 33. However, they may also be DC isolated from the first secondary coil. Moreover, the primary winding 5 may comprise other coils in addition to the first primary coil 31. Analogously, the length of these further coils may at the most be equal to that of the first primary coil 31 and they must be arranged so that a straight line between any point of such a coil and any point of the first secondary coil 33 always intersects the first primary coil 31. A transformer satisfying these requirements is suitable for use in a circuit as shown in FIG. 1 or in another generator for generating electric voltages, for example, an alternating voltage generator in which the rectifier 21 and the smoothing capacitor 23 are absent.

I claim:

1. Apparatus for generating an electric voltage, comprising a transformer having a core of a ferromagnetic material, a primary winding and a secondary winding, the primary winding comprising a first primary coil wound in the form of a solenoid, said primary winding being connected to a primary circuit which comprises a source of time-dependent voltages, the secondary winding comprising a first secondary coil wound in the form of a solenoid and being connected to a secondary circuit, said first primary and secondary coils being concentrically disposed on the core with intermediate electrical insulation means, wherein, in order to inhibit interference between the primary circuit and the secondary circuit, the first primary coil and the first secondary coil have the same length, comprise the same number of turns of wire of the same diameter, and occupy the same axial position on the core, the winding sense of said coils and their connection to the primary circuit and the secondary circuit being chosen so that, in operation, correspondingly situated ends of the first primary and secondary coils carry alternating voltages of the same polarity.

2. Apparatus as claimed in claim 1, wherein further coils associated with the primary winding or the secondary winding have a length which at the most equals the length of the first primary and secondary coils and are disposed on the core so that a straight line between any point of a further primary or secondary coil and any pont of the first secondary or primary coil, respectively, always intersects the first primary or secondary coil, respectively.

3. An apparatus as claimed in claim 1 wherein said primary circuit comprises:
   a transistor switch operating at a high frequency and connected in series circuit with said primary winding,
   a rectifier circuit having an input coupled to a source of low frequency AC voltage and an output coupled to said series circuit whereby high frequency voltage pulses are suppled to said primary winding.

4. Apparatus as claimed in claim 1 wherein:
   said primary circuit includes a transistor switch connected in series with the primary winding to terminals of a source of DC voltage, and
   said secondary circuit includes a rectifier and a capacitor coupling the secondary winding to terminals of a load circuit.

5. A low interference transformer comprising:
   a core of ferromagnetic material,
   a primary winding wound on a part of said ferromagnetic core, said primary winding having terminals for connection to a primary circuit including a source of time dependent voltage,
   a secondary winding wound on said part of the ferromagnetic core so that the primary and secondary windings are concentrically disposed on the ferromagnetic core and with a space therebetween which includes an electric insulation material but substantially free of any electrostatic shielding, said secondary winding having terminals for connection to a secondary circuit, and wherein
   the primary winding and the secondary winding have the same length, comprise the same number of turns of same diameter wire and occupy the same axial position on the ferromagnetic core, and the winding sense of said primary winding and said secondary winding and their respective connections to the primary circuit and the secondary circuit are arranged so that, in operation, correspondingly positioned turns of the primary winding and the secondary winding develop alternating voltages of the same polarity whereby interference between the primary circuit and the secondary circuit is minimized.

6. A transformer as claimed in claim 5 wherein at least one of said windings comprise first and second coils, wherein said first coil and the other one of said windings comprise said primary and secondary windings as set forth in claim 5, and wherein the second coil is wound around the first coil so that the first coil is intermediate the second coil and said other one of said windings so as to form an electrostatic shield therebetween, and wherein the length of the second coil does not exceed the length of the first coil.

7. A transformer as claimed in claim 6 wherein said first and second coils comprise a single wire of uniform diameter.

8. A transformer as claimed in claim 6 wherein one end of said first coil is directly connected to one end of said second coil.

9. A transformer as claimed in claim 5 wherein said source of time dependent voltage produces high frequency voltage pulses.

* * * * *